US008406278B2

United States Patent
Ghassemzadeh et al.

(10) Patent No.: US 8,406,278 B2
(45) Date of Patent: Mar. 26, 2013

(54) NARROWBAND INTERFERENCE REJECTION FOR ULTRA-WIDEBAND SYSTEMS

(75) Inventors: Saeed S. Ghassemzadeh, Andover, NJ (US); Jason Vincent Bellorado, Santa Clara, CA (US); Ashley B. Tarokh, Brookline, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 474 days.

(21) Appl. No.: 12/622,493

(22) Filed: Nov. 20, 2009

(65) Prior Publication Data

US 2010/0304681 A1     Dec. 2, 2010

Related U.S. Application Data

(60) Provisional application No. 61/182,803, filed on Jun. 1, 2009.

(51) Int. Cl.
*H04B 1/00* (2006.01)
(52) U.S. Cl. ...................................................... 375/146
(58) Field of Classification Search .................. 375/146
See application file for complete search history.

(56) References Cited

U.S. PATENT DOCUMENTS

| | | | |
|---|---|---|---|
| 6,700,923 B1 * | 3/2004 | Dowling et al. | 375/148 |
| 6,920,172 B2 | 7/2005 | Williams et al. | |
| 6,975,673 B1 * | 12/2005 | Rouquette | 375/149 |
| 7,643,801 B2 * | 1/2010 | Piirainen | 455/114.2 |
| 7,852,908 B1 * | 12/2010 | Norman | 375/150 |
| 2002/0191690 A1 | 12/2002 | Pendergrass et al. | |
| 2004/0029543 A1 | 2/2004 | Steele et al. | |
| 2005/0276311 A1 * | 12/2005 | Brajal et al. | 375/140 |
| 2007/0165693 A1 | 7/2007 | Mo et al. | |

OTHER PUBLICATIONS

Wei, "Interference-free broadband single- and multicarrier DS-CDMA" Communications Magazine, IEEE Date of Publication: Feb. 2005 vol. 43, Issue: 2 on pp. 68-73.*
Wei, "Downlink Space—Time Spreading Using Interference Rejection Codes" IEEE 2006.*
Wei, "Time- and Frequency-Domain Spreading Assisted MC DS-CDMA using Interference Rejection Spreading Codes for Quasi-Synchronous Communications", IEEE 2004.*
Sugiura, "Cooperative differential spacetime spreading for the asynchronous relay aided CDMA uplink using interference rejection spreading code," IEEE Signal Processing Letters, vol. 17, No. 2, pp. 117-120, 2010.*
Bellorado, Jason et al., "Time-Hopping Sequence Design for Narrowband Interference Suppression," IEEE Vehicular Tech. Conf., Sep. 26-29, 2004, pp. 3925-3929.
Sheng, Hongsan, et al., "On the Spectral and Power Requirements for Ultra-Wideband Transmission," Mitsubishi Electric Research Laboratories, Inc., 2003, http://www.merl.com, 7 pages.
Win, Moe Z., "A Unified Spectral Analysis of Generalized Time-Hopping Spread-Spectrum Signals in the Presence of Timing Jitter," IEEE Journal on Selected Areas in Communications, vol. 20, No. 9, Dec. 2002, pp. 1664-1676.

* cited by examiner

*Primary Examiner* — Juan A Torres
(74) *Attorney, Agent, or Firm* — Zagorin O'Brien Graham LLP

(57) ABSTRACT

A technique for reducing interference between a direct-sequence ultra-wideband communications system and a narrowband communications system uses interference-rejecting spreading codes to reduce signal power in a frequency band associated with the narrowband communications system. A method of operating an ultra-wideband communications system includes applying an interference-rejecting spreading code to a signal for transmission. The interference-rejecting spreading code is configured to reduce power in a particular frequency band of a transmit or receive power spectral density associated with the ultra-wideband signal without substantially reducing power outside that particular frequency band of the transmit or receive power spectral density associated with the ultra-wideband signal.

15 Claims, 7 Drawing Sheets

| Spreading Sequence | Nc | Spreading Gain (M) | Ta(ns) |
|---|---|---|---|
| $\underline{c_1} = [-1\ 1\ 1\ 1\ 1\ -1\ -1\ 1\ 1\ -1\ 1\ -1\ 1\ -1\ -1\ -1\ -1\ 1\ 1\ -1]$ | 1 | 10 | .962 |
| $\underline{c_2} = [1\ 1\ 1\ 1\ -1\ -1\ -1\ 1\ 1\ -1\ 1\ 1\ 1\ -1\ 1\ -1\ -1\ 1\ -1\ -1\ 1\ -1\ -1\ -1\ -1\ -1\ 1\ -1\ -1\ 1\ 1\ 1\ 1\ 1\ 1\ -1]$ | 1 | 18 | 1.732 |
| $\underline{c_3} = [1\ 1\ 1\ 1\ 1\ -1\ -1\ 1\ 1\ -1\ 1\ -1\ 1\ -1\ -1\ -1\ -1\ 1\ 1\ 1]$ | 3 | 10 | .962 |
| $\underline{c_4} = [-1\ 1\ 1\ 1\ -1\ -1\ -1\ 1\ 1\ -1\ 1\ 1\ 1\ -1\ 1\ -1\ -1\ 1\ -1\ -1\ 1\ -1\ -1\ -1\ -1\ -1\ 1\ -1\ -1\ 1\ 1\ 1\ 1\ 1\ 1\ 1]$ | 3 | 18 | 1.732 |

FIG. 3

NARROWBAND INTERFERENCE REJECTION FOR ULTRA-WIDEBAND SYSTEMS

CROSS-REFERENCE TO RELATED APPLICATION(S)

This application claims the benefit of U.S. Provisional Application No. 61/182,803, filed Jun. 1, 2009, entitled "Narrowband Interference Rejection for Ultra-Wideband Systems," naming Jason Vincent Bellorado, Ashley B. Tarokh, and Saeed S. Ghassemzadeh as inventors, which application is hereby incorporated by reference.

BACKGROUND

1. Field of the Invention

This invention relates to communications systems and more particularly to interference between communications systems.

2. Description of the Related Art

In general, an ultra-wideband (UWB) communications system transmits energy over a large portion of radio frequency (RF) spectrum not dedicated to a particular use by the Federal Communications Commission (FCC) (e.g., frequency bands having a range of one or more Giga-Hertz). One or more narrowband communications systems may operate proximate to the UWB communications system in overlapping frequency bands (e.g., frequency bands having a range of one or more Mega-Hertz of the UWB frequency band). Interference between signals associated with narrowband systems and signals associated with UWB systems may degrade performance of one or both of these communications systems.

SUMMARY

Accordingly, a technique for reducing interference between a direct-sequence ultra-wideband communications system and a narrowband communications system uses interference-rejecting direct-sequence spreading codes to reduce signal power in a frequency band associated with the narrowband communications system. In at least one embodiment of the invention, a method of operating an ultra-wideband communications system includes applying an interference-rejecting direct-sequence spreading code to a signal for transmission. The interference-rejecting direct-sequence spreading code is configured to reduce power in a first frequency band of a transmit power spectral density associated with the signal without substantially reducing power outside the first frequency band of the transmit power spectral density associated with the signal.

In at least one embodiment of the invention, an apparatus includes a code spreader configured to spread a symbol for transmission and introduce a notch into the spread signal power spectrum by applying a direct-sequence spreading code to the symbol. In at least one embodiment, the code spreader includes a first storage element including the symbol for transmission, a second storage element including a direct-sequence spreading code, and a computational device configured to apply the direct-sequence spreading code to the symbol for transmission.

In at least one embodiment of the invention, an apparatus includes a despreader configured to despread a received symbol and introduce a notch into the power spectrum of the received signal by applying a direct-sequence despreading code to the received signal. In at least one embodiment, the despreader includes a first storage element including the received signal, a second storage element including a direct-sequence despreading code, and a computational device configured to apply the direct-sequence despreading code to the received signal.

BRIEF DESCRIPTION OF THE DRAWINGS

The present invention may be better understood, and its numerous objects, features, and advantages made apparent to those skilled in the art by referencing the accompanying drawings.

FIG. 3 is a table including exemplary spreading sequences consistent with at least one embodiment of the invention.

The use of the same reference symbols in different drawings indicates similar or identical items.

DESCRIPTION OF THE PREFERRED EMBODIMENT(S)

Figure 1:
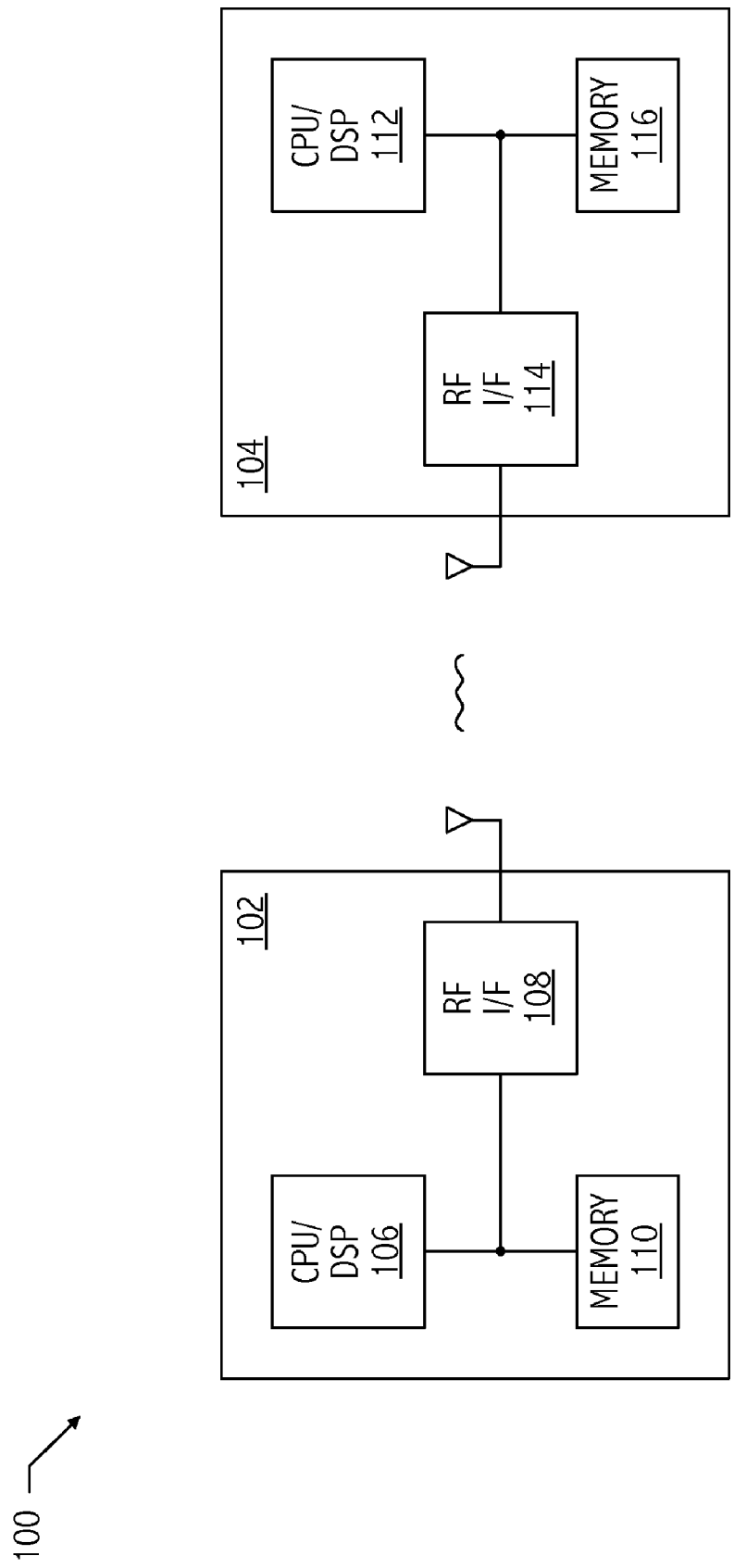
FIG. 1 is a functional block diagram of an exemplary wireless communications system.

Referring to FIG. 1, an exemplary wideband communications system (e.g., wideband communications system 100) includes two wideband communications units (e.g., communication unit 102 and communication unit 104) that communicate wirelessly over a wide frequency band of the electromagnetic spectrum (e.g., frequency bands having a range of one or more GHz). Communication units 102 and 104 each include a radio-frequency interface (e.g., radio frequency interfaces 108 and 114, respectively), processing circuitry (e.g., central processing unit/digital signal processors 106 and 112, respectively), and storage circuitry (e.g., memory units 110 and 116, respectively). The processing circuitry may include one or more of application-specific logic, a digital signal processor circuit configured to execute instructions stored in a storage device, a general purpose processing unit configured to execute instructions stored in a storage device, or other suitable circuitry for performing information processing and signal communications functions.

In at least one embodiment of communications system 100, wideband communications system 100 uses a direct-sequence spread spectrum modulation technique that phase-modulates a sine wave pseudorandomly with a continuous string of pseudonoise (PN) code symbols, i.e., chips. Typically, the string of PN code symbols is a finite-length pseudorandom sequence that the transmitter on communications unit 102 and the receiver on communications unit 104 agree upon prior to transmission. The string of PN code symbols is a pseudorandom sequence of 1 and −1 values at a frequency much higher than that of the original signal, thereby "spreading" the energy of the original signal into a much wider band. That is, the chip rate is much higher than the information signal bit rate and a transmitted signal occupies more bandwidth than the information signal that is being modulated. In general, ultra-wideband signals based on a direct-sequence architecture are characterized by short-duration baseband pulses to produce a low duty-cycle waveform with energy spread over a spectrum of several GHz.

The resulting signal resembles white noise, which can be used by a receiver to reconstruct the original data at the receiving end by a technique called "despreading." The data may be recovered by a despreading technique that correlates the received PN sequence with the PN sequence that the receiver determines that the transmitter used. For example, since 1×1=1, and −1×−1=1, the original data may be recovered from the received signal by multiplying the received signal by the same pseudorandom sequence used to spread the data. If another transmitter transmits on the same channel but with a different PN sequence (or no sequence at all), the despreading technique results in no processing gain for that signal. For despreading to recover the transmitted signal, the transmitter and receiver PN sequences are synchronized. Any suitable synchronization technique known in the art may be used.

The FCC imposes a reduced spectral mask on UWB signals, which relegates UWB signals to short and medium range, high data-rate applications. Coexistence issues impact performance of UWB signals and systems used for similar applications in close proximity to UWB systems. For example, UWB systems operating at a peak allowable power may substantially impact achievable data-rates of a nearby IEEE 802.11a standard-compliant wireless local area network (WLAN) operating in a non-line-of-sight (NLOS) environment. An 802.11a WLAN may induce a substantial reduction in signal-to-interference ratio of a UWB system.

In general, the actual PN sequence used by a UWB system determines the power spectral density (PSD) of the transmitted signal. Imposed interference is determined by the total average UWB power received within the bandwidth of a victim receiver. In at least one embodiment of a communications system 100, an interference-rejecting direct sequence spreading code when employed by a UWB transmitter, imposes a relatively small amount of interference on a nearby narrowband system. The interference-rejecting code induces a notch into the transmitted UWB power spectrum where the victim receiver operates and thereby rejects interference associated with the victim device.

Figure 2:
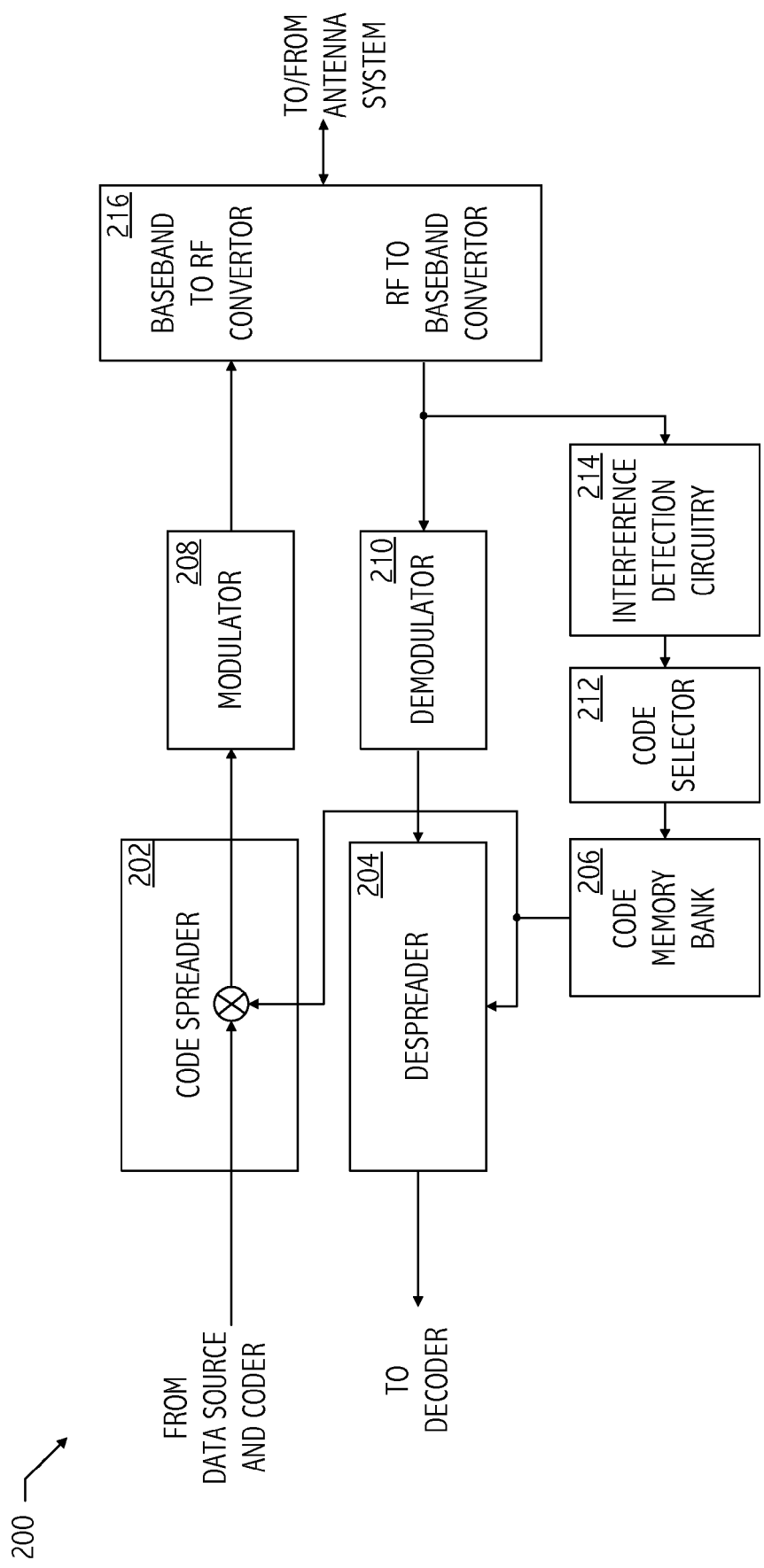
FIG. 2 is a functional block diagram of an exemplary transceiver of the wireless communications system of FIG. 1 consistent with at least one embodiment of the invention.
Figure 4A:
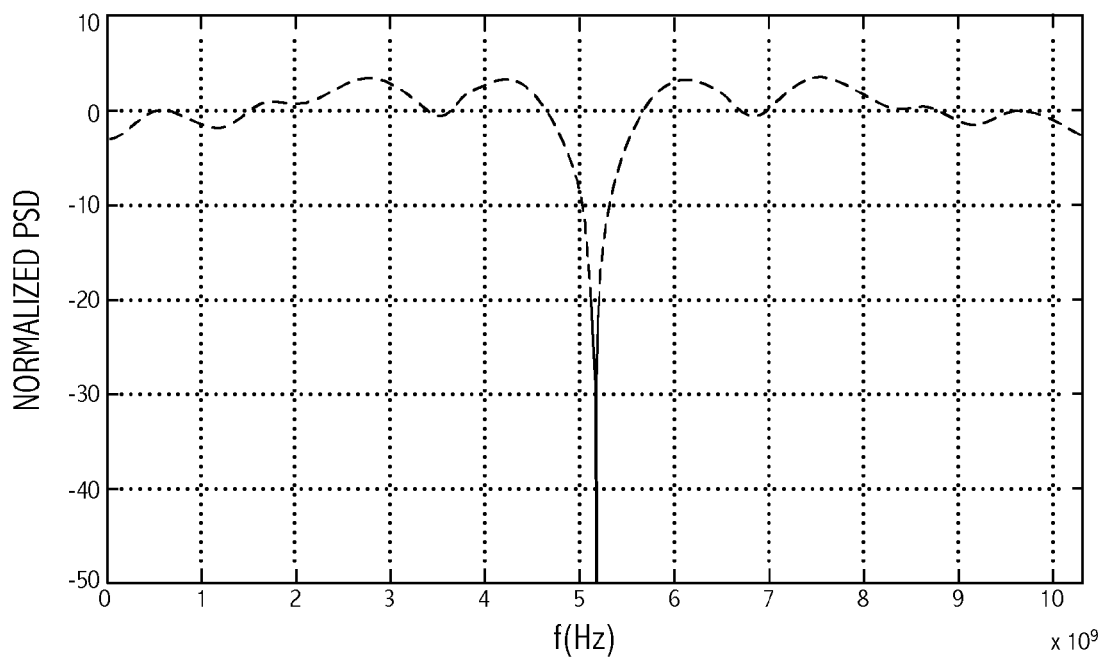
FIGS. 4A and 4B illustrate a transmitted power spectral density and autocorrelation function of a short-code DS-UWB signal consistent with at least one embodiment of the invention.
Figure 4B:
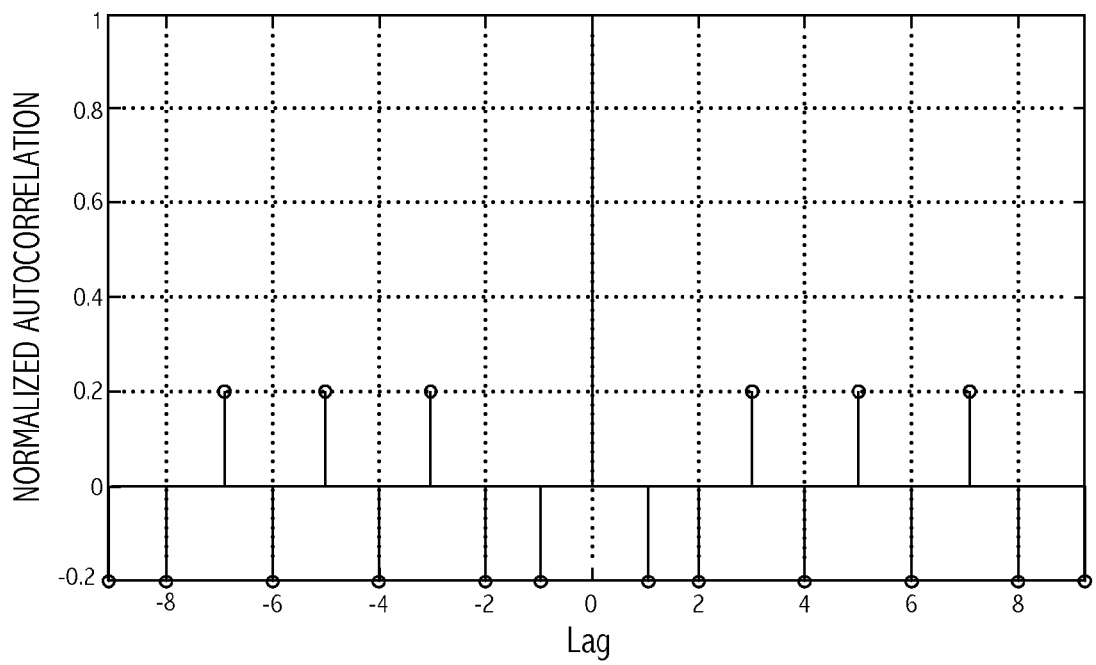
Figure 5A:
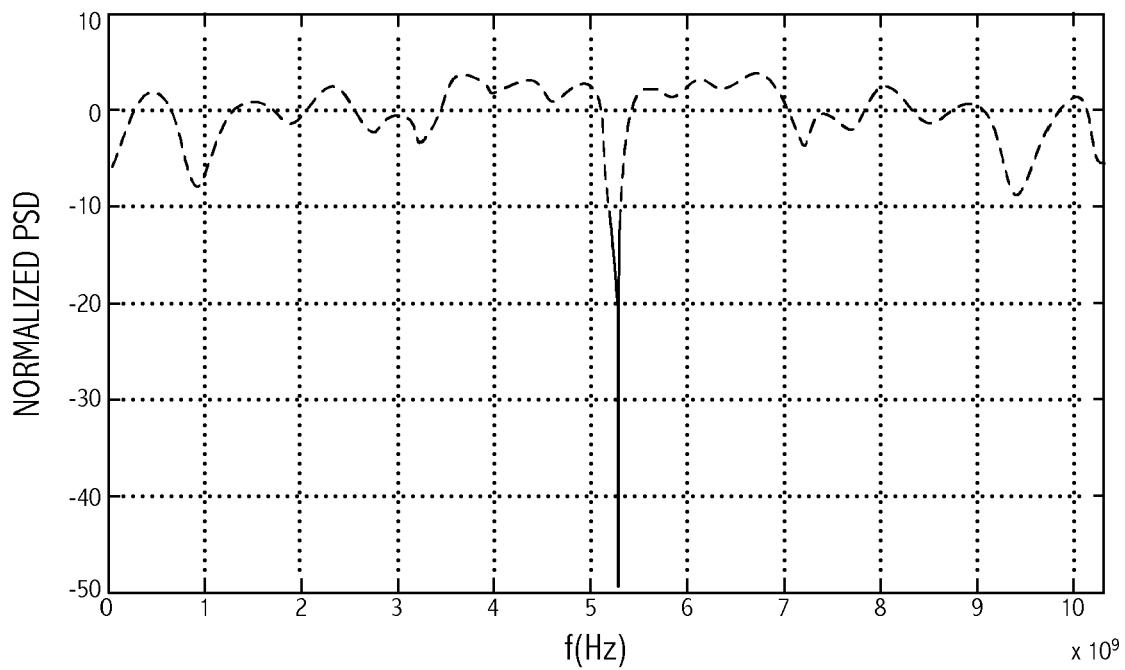
FIGS. 5A and 5B illustrate a transmitted power spectral density and autocorrelation function of a short-code DS-UWB signal consistent with at least one embodiment of the invention.
Figure 5B:
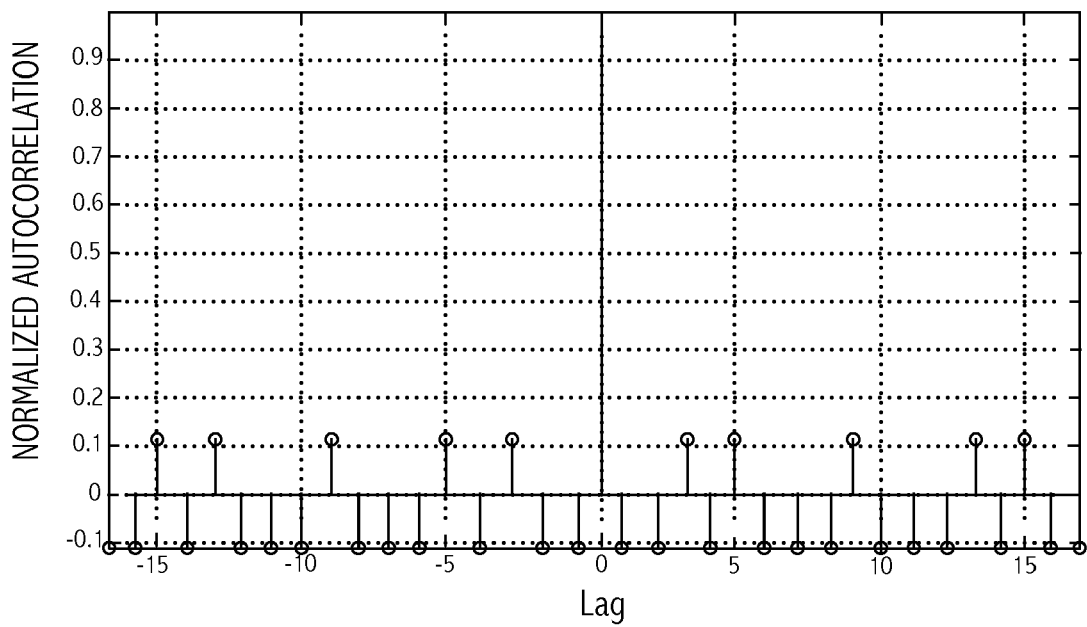
Figure 6A:
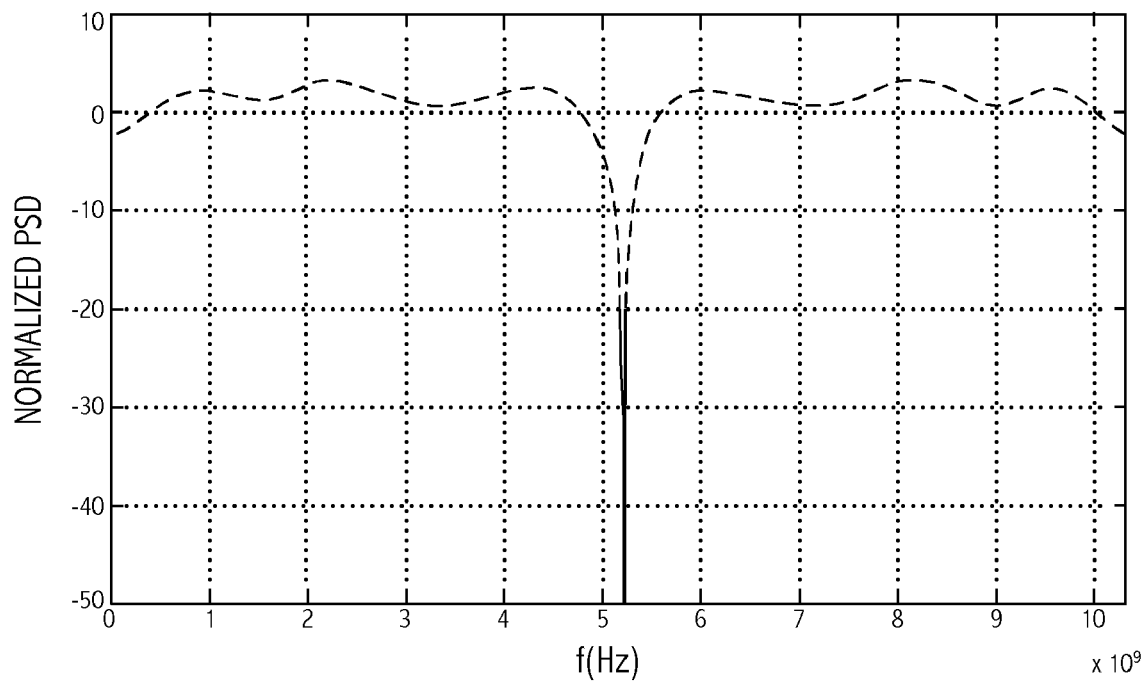
FIGS. 6A and 6B illustrate a transmitted power spectral density and autocorrelation function of a long-code DS-UWB signal consistent with at least one embodiment of the invention.
Figure 6B:
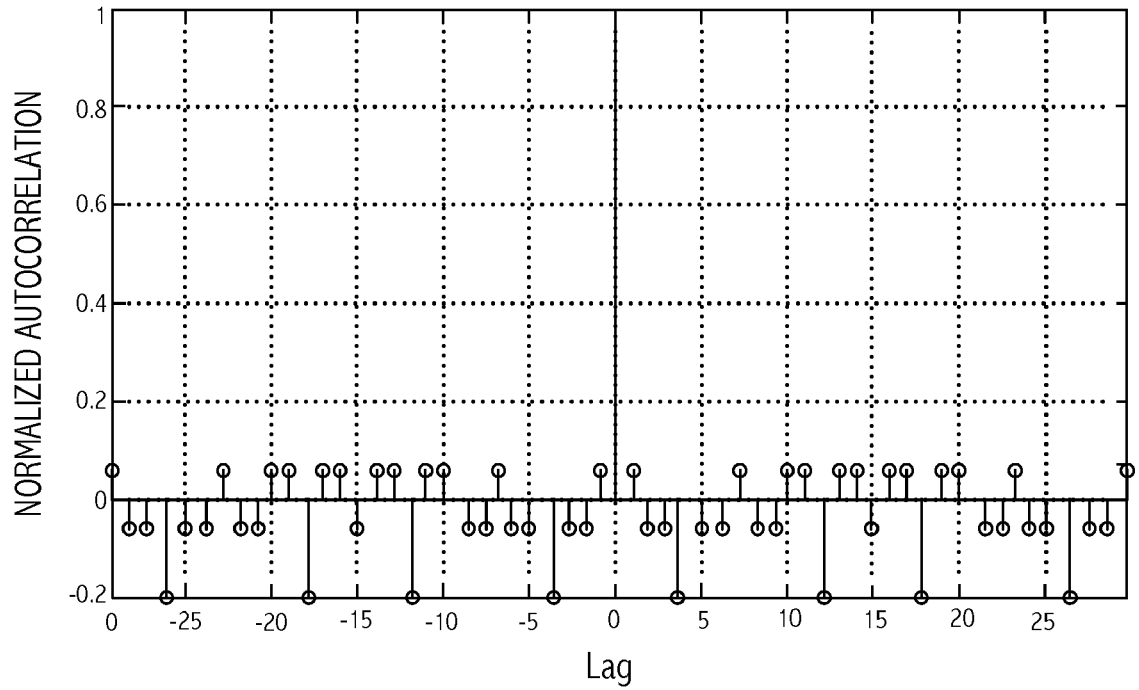
Figure 7A:
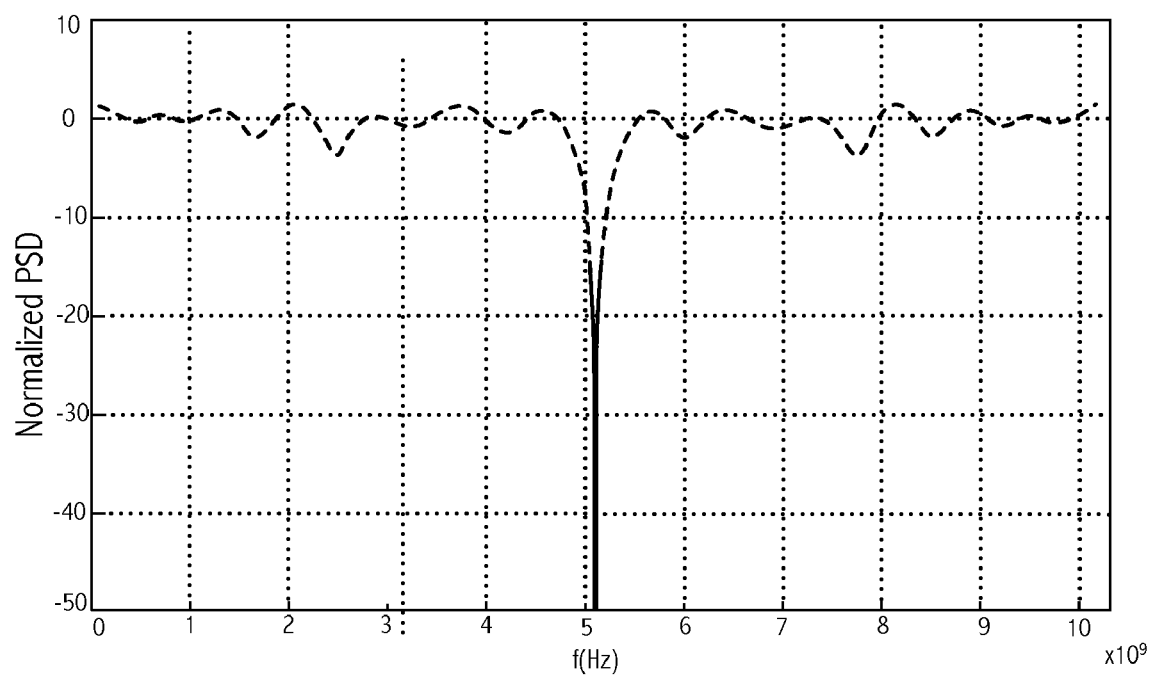
FIGS. 7A and 7B illustrate a transmitted power spectral density and autocorrelation function of a long-code DS-UWB signal consistent with at least one embodiment of the invention.
Figure 7B:
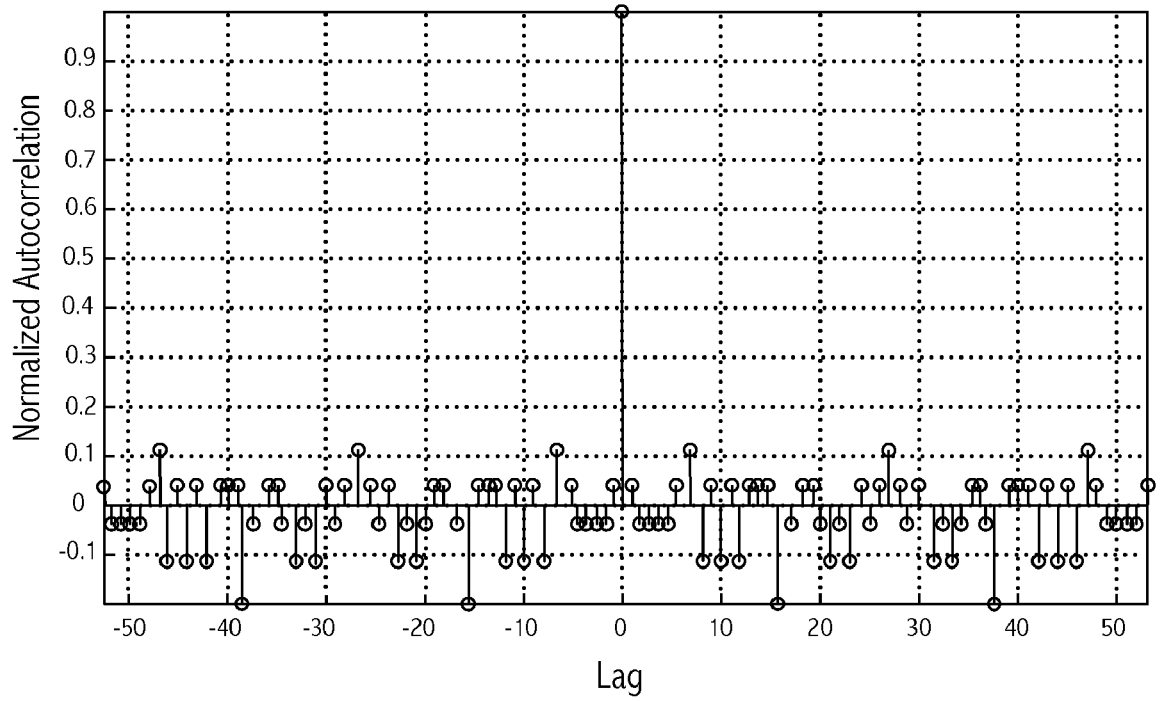

Referring to FIGS. 1 and 2, in at least one embodiment of communications system 100, resources of communications unit 102 and communications unit 104 are configured as exemplary transceiver portion 200. Transceiver portion 200 includes a transmit path (e.g., code spreader 202, modulator 208, and RF interface 216) that processes data for transmission and a receive path (e.g., RF interface 216, demodulator 210, and despreader 204) that recovers data from a received signal. Code spreader 202 may be a multiplier unit, a general purpose processor or digital signal processor configured to execute code, or other suitable hardware that applies the interference-rejecting direct-sequence spreading codes to the data for transmission. Code despreader 204 may be a multiplier unit, a general purpose processor or digital signal processor configured to execute code, or other suitable hardware that applies the interference-rejecting direct-sequence despreading codes to the received signal. In at least one embodiment of communications system 100, rather than using typical orthogonal spreading codes (e.g., Walsh-Hadamard codes, or other suitable spreading codes), transceiver 200 uses interference-rejecting direct-sequence spreading codes, which may also be referred to as interference-rejecting codes or interference-rejecting spreading codes.

In at least one embodiment of transceiver portion 200, code selector 212 selects interference-rejecting direct-sequence codes for use by code spreader 202 and code despreader 204 from a plurality of spreading and despreading codes stored in code memory bank 206. Interference-rejecting direct-sequence spreading codes reduce signal power in a predetermined frequency band of a transmit power spectral density associated with a signal for transmission without substantially reducing power outside the first frequency band of the transmit power spectrum associated with the signal. In at least one embodiment of communications system 100, the predetermined frequency band is much narrower than the frequency band of the transmit signal. Application of the interference-rejecting direct sequence spreading code introduces a notch into the power spectrum of the spread signal for transmission, i.e., signals associated with the predetermined frequency band are substantially attenuated (e.g., the in-band interference power is below the noise-floor as observed by the victim receiver, thus resulting in negligible interference). In the receive path, interference-rejecting direct-sequence despreading codes reduce signal power in a frequency band of a received power spectral density associated with a received and despread signal without substantially reducing power outside the first frequency band of the power spectrum associated with a received signal. The application of interference-rejecting direct sequence despreading codes to the received signal introduces a notch into the power spectrum of the received signal when energy is received in the first frequency band (e.g., when interference is received from a narrowband transmitter).

In at least one embodiment of a UWB communications system, code selector 212 selects a set of interference-rejecting codes based on one or more frequency bands in which interference detection circuitry 214 detects interference. For example, during a portion of communications system initialization and training sequence, communications unit 104 is not transmitting a signal (i.e., in a quiet period) or is transmitting a predetermined training signal and communications unit 102 performs a signal-to-noise ratio analysis or other suitable technique to detect energy in a particular frequency band. If interference detection circuitry 214 on communication unit 102 detects substantial energy in the particular frequency band during the quiet period or detects unexpected substantial energy in a particular frequency band during receipt of the predetermined training signal, interference detection circuitry 214 identifies the particular frequency band and communicates an indicator of the particular frequency band containing the interference to code selector 212. Then code selector 212 selects one or more interference-rejecting direct-sequence codes that correspond to the particular frequency band identified by interference detection circuitry 214. The one or more interference-rejecting direct-sequence codes are communicated to code spreader 202 and/or code despreader 204 for use during subsequent communications (e.g., steady-state data communications). In another embodiment, transceiver 200 is designed to operate with a predetermined set of interference-rejecting direct-sequence codes and code selector 212 and interference detecting circuitry 214 are not included and/or not used. The predetermined set of interference-rejecting codes may be user-selectable, hardwired, loaded from memory, or determined using any other suitable technique. A technique for generating interference-rejecting direct-sequence spreading codes that reduce interference between a UWB system and one or more narrowband systems (e.g., a narrowband system operating in proximity to a wideband system) uses a gradient-descent style algorithm that is described below.

In at least one embodiment, a direct sequence ultra-wideband (DS-UWB) communications system utilizes ultra-short baseband pulses which use a significantly broader bandwidth than the bandwidth of the user data. Spreading is achieved by dividing the symbol interval $T_S$ into N equal-length sub-intervals (i.e., chips), each of which carries a single short-pulse positioned at the start of its sub-interval. Such a time division by a factor N translates directly into a frequency broadening by a factor N and, thus, N is referred to as the spreading factor. The spreading sequence eventually repeats and, thus, the DS-UWB signal is expressed in terms of a single repetition of the spreading code.

In at least one embodiment of communications system 100, binary pulse-amplitude modulation is used for a DS-UWB signal. A given data-symbol $a \in S_A\{-1, 1\}$. Accordingly, a DS-UWB signal for a single spreading code repetition is expressed as, $$x_a^{(s)}(t) = a \sum_{i=0}^{N-1} c_i \delta(t - iT_s/N),$$

where the superscript $(_s)$ denotes a short-code signal. Also, the spreading code $$c=(c_0, c_1, \ldots, c_{N-1}) \in \{-1,1\}^N$$

repeats for each transmitted data-symbol and, thus, its length is equal to the spreading factor N.

In at least one embodiment of a DS-UWB communications system, the DS-UWB signal is not limited to a short spreading code, i.e., a spreading code that repeats for each data symbol. In at least one embodiment of communications system 100, a long spreading code is used, i.e., a spreading code that spans multiple data-symbols before repetition. Specifying the length (in data-symbols) of a long-code by $N_c$, and denoting a given sequence of $N_c$ data-symbols by $a=(a_0, a_1, \ldots, a_{N_c-1}) \in S^{N_c}$, the long-code DS-UWB signal is expressed as, $$x_a^{(l)}(t) = \sum_{i=0}^{N_c-1} a_i \sum_{j=0}^{N-1} c_{i,j} \delta(t - jT_s/N - iT_s).$$

Although the spreading sequence spans $N_c$ data-symbols, the spreading factor is N for a long-code system. Note that the long-code DS-UWB signal is a generalization of the short-code DS-UWB signal (i.e. a short-code signal is equivalent to a long-code signal with $N_c=1$) and thus long-code DS-UWB and short-code DS-UWB are not explicitly distinguished between unless necessary. The DS-UWB signal is expressed in terms of an infinite sequence of data symbols $\{a_k\}$ and a random delay $f$ uniformly distributed on the interval $[0, N_c T_s)$ as $$x(t) = \sum_{k=-\infty}^{\infty} x_{a_k}(t - kT_s N_c - \theta).$$

For a given spreading sequence c, $$c=(c_{0,0}, \ldots, c_{0,N-1}, \ldots, c_{N_c-1,N-1}),$$

the interference-rejecting direct-sequence codes are generated based on a transmitted PSD represented as, $$P_{xx}(f) = \frac{A}{N_c} \sum_{i=0}^{N_c-1} \left[ \sum_{l_1=0}^{N-1} \sum_{l_2=0}^{N-1} c_{i,l_1} c_{i,l_2} \cos(2\pi f T_s (l_1 - l_2)/N) \right],$$

where A is a positive scaling constant.

In at least one embodiment of the code generating technique, an objective function is used that is the percentage of the total UWB transmitted power falling inside of a frequency band of interest, e.g., IEEE 802.11a receiver bandwidth. The objective function used to determine interference rejection spreading codes is $$J(\underline{c}) = \frac{\sum_{f_m \in \beta'} P_{xx}(f_m)}{\sum_{f_m \in \beta} P_{xx}(f_m)},$$

where $\beta$ is the set of all frequencies from DC to the sampling frequency and $\beta'$ is the set of all frequencies inside a frequency band of interest, e.g., an 802.11a frequency band. The technique reduces (e.g., to a local minimum of the objective function) the percentage of the total UWB transmitted power falling inside of the 802.11a receiver bandwidth. To obtain a single dimension (j) of the gradient vector, the derivative is taken with respect to a single element of the direct sequence $c_j$. Convergence is only guaranteed to a stable point of the objective function and not to a global minimum.

Using this technique, where $N_c=1$ (i.e., a short-code DS-UWB signal) and the first subscript on the spreading code is dropped, the $j^{th}$ element of the gradient vector is:

$$\nabla J(\underline{c})_j = \frac{\left| \sum_{f \in \beta} \sum_{l=0-,l \neq j}^{N-1} c_l \cos\left(\frac{2\pi f T_s (l-j)}{N}\right) \right|}{\left[ \sum_f \sum_{l_1,l_2=0}^{N-1} c_{l_1} c_{l_2} \cos\left(\frac{2\pi f T_s (l_1-l_2)}{N}\right) \right]} -$$

$$\frac{\left[ \sum_{f \in \beta} \sum_{l_1,l_2=0}^{N-1} c_{l_1} c_{l_2} \cos\left(\frac{2\pi f T_s (l_1-l_2)}{N}\right) \right] \left[ \sum_f \sum_{l=0,l \neq j}^{N-1} c_l \cos\frac{(2\pi f T_s (l-j))}{N} \right]}{\left[ \sum_f \sum_{l_1,l_2=0}^{N-1} c_{l_1} c_{l_2} \cos\left(\frac{2\pi f T_s (l_1-l_2)}{N}\right) \right]^2},$$

which is utilized to conduct the gradient-descent spreading sequence optimization procedure.

The continuous gradient-descent algorithm is given by the following iterative equation:

$$\underline{c}^{(k+1)} = \underline{c}^{(k)} - \eta(k) \nabla J(\underline{c})|_{\underline{c}=\underline{c}^{(k)}}$$

where the direct sequence at iteration k is given by the vector $c^{(k)}$, $\nabla J(c)$ is the gradient of the objective function, and $\eta(k)$ is the step size.

In at least one embodiment of communications system 100, in addition to rejecting power in a frequency band of interest, at least one additional criterion is used to determine interference-rejecting direct-sequence spreading codes. In at least one embodiment of a communications system, the interference-rejecting direct-sequence spreading codes are selected based on the autocorrelation of the direct-sequence spreading code. For example, referring to a method used by a DS-UWB receiver to synchronize to a received signal with unknown phase, the receiver detects the peak of a sliding correlation performed between the received signal and a locally generated waveform utilizing the same spreading sequence. Thus, spreading sequences that exhibit large non-zero lag autocorrelations relative to the sequence length are avoided, since, in the presence of noise, those peaks can be easily mistaken for the central peak. Such an event is referred to as a false-lock, and may result in loss of all data preceding a next synchronization attempt. In at least one embodiment of communications system 100, a randomized starting sequence is used and spreading sequences with favorable autocorrelation properties are selected.

In at least one embodiment of the technique for determining interference-rejecting direct-sequence spreading codes, when selecting an interference-rejecting direct-sequence code, code-length is traded off with performance (e.g., interference and correlation). For a given length l, the restriction of spreading sequences binary vectors results in a set of only $2^l$ possible sequences. For small l, the existence of a code that performs well with respect to either figure-of-merit, may be unlikely. Accordingly, short-codes with large spreading factors or long-codes may be used to achieve target performance levels from a resulting DS-UWB signal.

Referring to Table 1 of FIG. 3, four spreading sequences are designed for the reduction of interference in the 5150-5250 MHz lower UNII frequency band utilized by IEEE 802.11a WLANs. The first two codes presented $c_1$ and $c_2$, which are short-codes with respective spreading factors of 10 and 18, have transmitted power spectral densities (PSDs) and autocorrelation functions given in FIGS. 4A and 4B and FIGS. 5A and 5B, respectively. The portion of the PSD inside the band-of-interest is illustrated as a solid line. The PSD remains over 20 dB below the median power spectrum in this band for $c_1$ and 13 dB below the median power spectrum in this band for $c_2$. However, note that the autocorrelation function of $c_1$ has a maximum non-zero lag correlation of 0.2 and that the autocorrelation function of $c_2$ has a maximum non-zero lag correlation of 0.11. In general, as the code length (and, thus, spreading factor) increases, the code performance with respect to both figures-of-merit increases. In at least one embodiment of communications system 100, short codes of length 10 or greater are selected. Accordingly, a spreading factor of 10 or greater is used.

In at least one embodiment of communications system 100, long-codes are used. For example, $c_3$ and $c_4$ of Table 1 have the same spreading factors as $c_1$ and $c_2$ (10 and 18, respectively), but span three data-symbols. Referring to FIGS. 6A and 6B and FIGS. 7A and 7B, an increase in overall code length of a long-codes results in a narrower notch to be achieved in the transmitted PSD as compared to a short-code with an equivalent spreading factor, while maintaining notch depth. In addition, use of a long-code results in a more favorable autocorrelation function as compared to the auto-correlation achieved with a short-code. Although the maximum non-zero lag correlation has not been reduced in either of these cases as compared to the corresponding short-codes, the average non-zero lag correlation is substantially reduced. By increasing the code-length $N_b$ beyond 3, codes which perform well with respect to both figures-of-merit are achievable for even smaller spreading factors.

Interference imposed by a UWB system on a victim narrowband communication system (e.g., an IEEE standard 802.11a WLAN) may be determined based on signal-to-interference ratio, probability of jamming, impact of interference on the data-rate of the victim receiver, or other suitable technique. The impact typically varies as a function of the separation of both the transmitter (e.g., WLAN) and interferer (e.g., UWB transmitter) from the victim receiver. As a point of reference, an infinite interferer-receiver separation (i.e., no interferer) may be used.

In at least one embodiment of a communications system, each user of a multi-user scenario is assigned a unique spreading sequence such that they may be distinguished by their intended receiver. Thus, the design methodology requires that multiple interference-rejecting spreading codes be determined according to the above-described techniques.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic storage medium.

The description of the invention set forth herein is illustrative, and is not intended to limit the scope of the invention as set forth in the following claims. For example, while the invention has been described in an embodiment in which an 802.11a communications system operates in proximity to a UWB communications system, one of skill in the art will appreciate that the teachings herein can be utilized with interference in other frequency bands. Variations and modifications of the embodiments disclosed herein, may be made based on the description set forth herein, without departing from the scope and spirit of the invention as set forth in the following claims.

What is claimed is:

1. A method of operating a communications system comprising:

selecting, by the communications system, an interference-rejecting direct-sequence spreading code, the selecting being based on a received signal, the interference-rejecting direct-sequence spreading code being configured to reduce power in a first frequency band of a transmit power spectral density associated with a spread signal without substantially reducing power outside the first frequency band of the transmit power spectral density associated with the spread signal; and applying, by a transmit path of the communications system, the interference-rejecting direct-sequence spreading code to a signal for transmission to generate the spread signal.

2. The method, as recited in claim 1, further comprising:
determining the interference-rejecting direct-sequence spreading code iteratively using gradient-descent spreading code optimization.

3. The method, as recited in claim 1, wherein selecting the interference-rejecting direct-sequence spreading code comprises:
detecting interference in the first frequency band and selecting the interference-rejecting direct-sequence spreading code based thereon.

4. The method, as recited in claim 1, further comprising:
reducing a ratio of transmit power in the first frequency band to transmit power in a second frequency band to thereby determine the interference-rejecting direct-sequence spreading code, wherein the second frequency band is substantially wider than the first frequency band and the second frequency band includes the first frequency band.

5. The method, as recited in claim 4, wherein the first frequency band is approximately 200 MHz wide and the second frequency band is approximately 7 GHz wide.

6. The method, as recited in claim 1, wherein the selecting comprises:
selecting the interference-rejecting direct-sequence spreading code from a plurality of predetermined interference-rejecting direct-sequence spreading codes at least partially based on detection of interference in the first frequency band,
wherein the plurality of predetermined interference-rejecting direct-sequence spreading codes corresponds to ones of codes configured to reduce interference in a plurality of respective frequency bands within a second frequency band substantially wider than the first frequency band.

7. The method, as recited in claim 1, wherein elements of the interference-rejecting direct-sequence spreading code are $c \in \{1,-1\}$.

8. The method, as recited in claim 1, wherein the interference-rejecting direct-sequence spreading code is generated based on a closed-form representation of a power spectral density of a transmitted signal, represented as $$P_{xx}(f) = \frac{A}{N_c} \sum_{i=0}^{N_c-1} \left[ \sum_{l_1=0}^{N-1}\sum_{l_2=0}^{N-1} c_{i,l_1} c_{i,l_2} \cos(2\pi f T_s (l_1 - l_2)/N) \right],$$

where A is a positive scaling constant, N is a spreading factor, $N_c$ is the number of data symbols spanned by the spreading code before repetition, $c_{i,l}$ is an element of a direct sequence spreading code c, and $T_s$ is the symbol interval.

9. The method, as recited in claim 1, wherein the interference-rejecting direct-sequence spreading code is based on a gradient vector of an objective function J(c) having a jth element represented as $$\nabla J(\underline{c})_j = \frac{\left[\sum_{f \in \beta} \sum_{l=0-,l\neq j}^{N-1} c_l \cos\left(\frac{2\pi f T_s (l-j)}{N}\right)\right]}{\left[\sum_{f} \sum_{l_1,l_2=0}^{N-1} c_{l_1} c_{l_2} \cos\left(\frac{2\pi f T_s (l_1-l_2)}{N}\right)\right]} - \frac{\left[\sum_{f \in \beta} \sum_{l_1,l_2=0}^{N-1} c_{l_1} c_{l_2} \cos\left(\frac{2\pi f T_s (l_1-l_2)}{N}\right)\right]\left[\sum_{f} \sum_{l=0,l\neq j}^{N-1} c_l \cos\frac{(2\pi f T_s (l-j))}{N}\right]}{\left[\sum_{f} \sum_{l_1,l_2=0}^{N-1} c_{l_1} c_{l_2} \cos\left(\frac{2\pi f T_s (l_1-l_2)}{N}\right)\right]^2}$$

where $c_l$ is an element of a direct sequence spreading code c, N is a spreading factor, and $T_s$ is the symbol interval.

10. The method, as recited in claim 1, wherein a non-zero lag autocorrelation of an element of the interference-rejecting direct-sequence spreading code is approximately zero.

11. An apparatus comprising:
a code spreader comprising:
a first storage element configured to store a symbol for transmission;
a second storage element configured to store an interference-rejecting direct-sequence spreading code; and
a computational module configured to apply the interference-rejecting direct-sequence spreading code to the symbol for transmission to generate a spread signal,
wherein the code spreader is configured to spread the symbol for transmission and introduce a notch into a power spectrum of the spread signal by applying the interference-rejecting direct-sequence spreading code to the symbol for transmission.

12. The apparatus, as recited in claim 11, further comprising:
a plurality of storage elements storing a corresponding plurality of predetermined interference-rejecting direct-sequence spreading codes, wherein the plurality of predetermined interference-rejecting direct-sequence spreading codes correspond to respective ones of a plurality of frequency bands within a second frequency band substantially wider than the first frequency band; and
a select circuit configured to select the interference-rejecting direct-sequence spreading code from the plurality of predetermined interference-rejecting direct-sequence spreading codes at least partially based on detection of interference in the first frequency band.

13. The apparatus, as recited in claim 11, wherein the interference-rejecting direct-sequence spreading code is configured to reduce power in a first frequency band of a spectrum of the spread signal when transmitted without substantially reducing power outside the first frequency band of the spectrum of the spread signal when transmitted.

14. The apparatus, as recited in claim 11, wherein the interference-rejecting direct-sequence spreading code is based on a gradient vector of an objective function J(c) having a jth element represented as $$\nabla J(\underline{c})_j = \frac{\left[\sum_{f \in \beta} \sum_{l=0-,l\neq j}^{N-1} c_l \cos\left(\frac{2\pi f T_s (l-j)}{N}\right)\right]}{\left[\sum_{f} \sum_{l_1,l_2=0}^{N-1} c_{l_1} c_{l_2} \cos\left(\frac{2\pi f T_s (l_1-l_2)}{N}\right)\right]} - \frac{\left[\sum_{f \in \beta} \sum_{l_1,l_2=0}^{N-1} c_{l_1} c_{l_2} \cos\left(\frac{2\pi f T_s (l_1-l_2)}{N}\right)\right]\left[\sum_{f} \sum_{l=0,l\neq j}^{N-1} c_l \cos\frac{(2\pi f T_s (l-j))}{N}\right]}{\left[\sum_{f} \sum_{l_1,l_2=0}^{N-1} c_{l_1} c_{l_2} \cos\left(\frac{2\pi f T_s (l_1-l_2)}{N}\right)\right]^2}$$

where $c_l$ is an element of a direct sequence spreading code c, N is a spreading factor, and $T_s$ is the symbol interval.

15. The apparatus, as recited in claim 11, wherein a non-zero lag autocorrelation of an element of the interference-rejecting direct-sequence spreading code is approximately zero.

* * * * *

UNITED STATES PATENT AND TRADEMARK OFFICE
CERTIFICATE OF CORRECTION

PATENT NO. : 8,406,278 B2
APPLICATION NO. : 12/622493
DATED : March 26, 2013
INVENTOR(S) : Saeed S. Chassemzadeh et al.

It is certified that error appears in the above-identified patent and that said Letters Patent is hereby corrected as shown below:

In the Claims:

In column 9, lines 45-60, please replace the equation in its entirety with the following equation:

$$\nabla J(\underline{c})_j = \frac{\left[\sum_{f \in \beta} \sum_{l=0-,l \neq j}^{N-1} c_l \cos(2\pi f T_s (l-j)/N)\right]}{\left[\sum_f \sum_{l_1,l_2=0}^{N-1} c_{l_1} c_{l_2} \cos(2\pi f T_s (l_1-l_2)/N)\right]} - \frac{\left[\sum_{f \in \beta} \sum_{l_1,l_2=0}^{N-1} c_{l_1} c_{l_2} \cos(2\pi f T_s (l_1-l_2)/N)\right]\left[\sum_f \sum_{l=0,l \neq j}^{N-1} c_l \cos(2\pi f T_s (l-j))/N\right]}{\left[\sum_f \sum_{l_1,l_2=0}^{N-1} c_{l_1} c_{l_2} \cos(2\pi f T_s (l_1-l_2)/N)\right]^2}$$

In column 10, lines 42-59, please replace the equation in its entirety with the following equation:

$$\nabla J(\underline{c})_j = \frac{\left[\sum_{f \in \beta} \sum_{l=0-,l \neq j}^{N-1} c_l \cos(2\pi f T_s (l-j)/N)\right]}{\left[\sum_f \sum_{l_1,l_2=0}^{N-1} c_{l_1} c_{l_2} \cos(2\pi f T_s (l_1-l_2)/N)\right]} - \frac{\left[\sum_{f \in \beta} \sum_{l_1,l_2=0}^{N-1} c_{l_1} c_{l_2} \cos(2\pi f T_s (l_1-l_2)/N)\right]\left[\sum_f \sum_{l=0,l \neq j}^{N-1} c_l \cos(2\pi f T_s (l-j))/N\right]}{\left[\sum_f \sum_{l_1,l_2=0}^{N-1} c_{l_1} c_{l_2} \cos(2\pi f T_s (l_1-l_2)/N)\right]^2}$$

Signed and Sealed this
Sixth Day of August, 2013

Teresa Stanek Rea
*Acting Director of the United States Patent and Trademark Office*